(12) United States Patent
Arai et al.

(10) Patent No.: US 7,617,360 B2
(45) Date of Patent: Nov. 10, 2009

(54) DISK ARRAY APPARATUS AND METHOD OF CONTROLLING THE SAME BY A DISK ARRAY CONTROLLER HAVING A PLURALITY OF PROCESSOR CORES

(75) Inventors: Masahiro Arai, Kanagawa (JP); Naoto Matsunami, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 271 days.

(21) Appl. No.: 11/134,447

(22) Filed: May 23, 2005

(65) Prior Publication Data
US 2006/0224826 A1 Oct. 5, 2006

(30) Foreign Application Priority Data
Mar. 30, 2005 (JP) .............................. 2005-097505

(51) Int. Cl.
*G06F 12/00* (2006.01)
*G06F 13/00* (2006.01)
*G06F 13/28* (2006.01)
*G06F 9/46* (2006.01)

(52) U.S. Cl. ...................................... 711/114; 718/105
(58) Field of Classification Search .................. 711/155
See application file for complete search history.

(56) References Cited
U.S. PATENT DOCUMENTS

| | | | | |
|---|---|---|---|---|
| 5,357,632 | A * | 10/1994 | Pian et al. .................... | 718/105 |
| 5,655,120 | A * | 8/1997 | Witte et al. .................. | 718/105 |
| 6,651,082 | B1 * | 11/2003 | Kawase et al. ............... | 718/105 |
| 6,986,140 | B2 * | 1/2006 | Brenner et al. .............. | 718/105 |
| 2007/0124733 | A1 * | 5/2007 | Bril et al. .................... | 718/104 |

FOREIGN PATENT DOCUMENTS

| | | |
|---|---|---|
| JP | 06-035871 | 2/1994 |
| JP | 09-160889 | 6/1997 |
| JP | 9160889 | 6/1997 |

OTHER PUBLICATIONS

J. Kim, et al "Process Allocation for Load Distribution in Fault-Tolerant Multicomputers", Fault-Tolerant Computing, 1995, FTCS-25, Digest of Papers, Jun. 1995, pp. 174-183.
B. Hamidzadah, et al "Dynamic Scheduling of Real-Time Aperiodic Tasks on Multiprocessor Architectures", System Sciences, 1996, Proceedings of the Twenty-Ninth Hawaii International Conference on, Wailea, HI, Jan. 1996, pp. 469-478.

* cited by examiner

*Primary Examiner*—Christian P Chace
*Assistant Examiner*—Gary W Cygiel
(74) *Attorney, Agent, or Firm*—Brundidge & Stanger, P.C.

(57) ABSTRACT

To efficiently manage performance resources while preventing a failure of a control processing from affecting another control processing in a disk array apparatus. The disk array apparatus has a disk array controller, which includes a CPU incorporating a plurality of processor cores that cannot be physically separated from each other, and each processor core serves as an unit processor. One unit processor manages the unit processors separately, allocates a self-contained control program to each unit processor so that the operation of the unit processor can be terminated appropriately or the unit processor can operate until the operation of the whole CPU is terminated, and manages the processing load or processing status of the allocated control program on a unit-processor basis.

10 Claims, 9 Drawing Sheets

| MPU CORE NO. | USING MODULE | TYPE OF ALLOCATION | PRIVILEGE LEVEL | GROUP NO. |
|---|---|---|---|---|
| 0 | MONITOR CONTROL | FIXED | 0 | 001 |
| 1 | SYSTEM MANAGEMENT | FIXED | 1 | 002 |
| 2 | RAID CONTROL | SEMI-FIXED | 2 | 003 |
| 3 | NAS CONTROL | SEMI-FIXED | 3 | 003 |
| 4 | HOST I/O CONTROL | SEMI-FIXED | 4 | 004 |
| 5 | DRIVE I/O CONTROL | SEMI-FIXED | 4 | 004 |
| 6 | NOT ALLOCATED | DYNAMIC | 255 | 003 |
| 7 | NOT ALLOCATED | DYNAMIC | 255 | 003 |
| 8 | NOT ALLOCATED | DYNAMIC | 255 | 004 |
| 9 | NOT ALLOCATED | DYNAMIC | 255 | -1 |

| USING MODULE | LOAD THRESHOLD(%) | PRESCRIBED NUMBER OF TIMES OF EXCEEDING THRESHOLD |
|---|---|---|
| MONITOR CONTROL | 100 | 1 |
| SYSTEM MANAGEMENT | 100 | 1 |
| RAID CONTROL | 90 | 5 |
| NAS CONTROL | 90 | 5 |
| HOST I/O CONTROL | 90 | 5 |
| DRIVE I/O CONTROL | 90 | 5 |

FIG.9

| MPU CORE NO. | LOAD (%) | GROUP NO. | STATUS | USING MODULE | TYPE OF ALLOCATION | PRIVILEGE | NUMBER OF TIMES OF EXCEEDING LOAD THRESHOLD |
|---|---|---|---|---|---|---|---|
| 0 | 50% | 001 | NORMAL | MONITOR CONTROL | FIXED | 0 | 0 |
| 1 | 60% | 002 | NORMAL | SYSTEM MANAGEMENT | FIXED | 1 | 0 |
| 2 | 70% | 003 | NORMAL | RAID CONTROL | SEMI-FIXED | 2 | 0 |
| 3 | 95% | 003 | NORMAL | NAS CONTROL | SEMI-FIXED | 3 | 0 |
| 4 | 70% | 003 | NORMAL | HOST I/O CONTROL | SEMI-FIXED | 4 | 0 |
| 5 | 40% | 004 | NORMAL | DRIVE I/O CONTROL | SEMI-FIXED | 4 | 0 |
| 6 | 0% | 004 | NORMAL | NOT ALLOCATED | DYNAMIC | 255 | 0 |
| 7 | 0% | 004 | NORMAL | NOT ALLOCATED | DYNAMIC | 255 | 0 |
| 8 | 0% | 000 | NORMAL | NOT ALLOCATED | DYNAMIC | 255 | 0 |

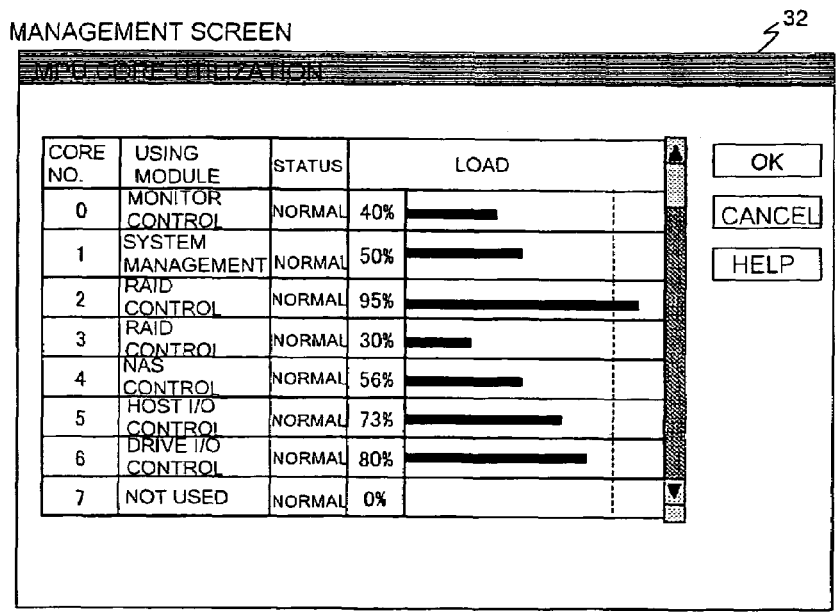

DISK ARRAY APPARATUS AND METHOD OF CONTROLLING THE SAME BY A DISK ARRAY CONTROLLER HAVING A PLURALITY OF PROCESSOR CORES

The present application is based on and claims priority of Japanese patent application No. 2005-097505 filed on Mar. 30, 2005, the entire contents of which are hereby incorporated by reference.

BACKGROUND OF THE INVENTION

1. Field of the Invention

The present invention relates to a disk array apparatus incorporating a plurality of disk units and a method of controlling the disk array apparatus.

2. Description of the Related Art

As a technique for improving the speed of access to data and the reliability of a disk array apparatus by providing a plurality of disk units, the redundant array of independent disks (RAID) has been known. Typically, a disk array controller is responsible for the RAID control, and the performance improvement of the disk array controller has been pursued.

The disk array controller has a CPU for executing a processing program for the array controller. According to an approach to the performance improvement, a plurality of CPUs are mounted on the disk array controller to enable parallel processing, thereby increasing the processing speed.

[Patent Document 1] Japanese Patent Publication No. 09-160889

[Patent Document 2] Japanese Patent Publication No. 06-35871

However, the disk array apparatus having a plurality of CPUs requires an expensive shared memory to share information among the CPUs. Thus, the cost is high relative to the performance improvement, and there is a problem that the cost-performance is reduced. In addition, since each CPU requires a clock or a power supply circuit, the assembly is enlarged, and thus, the production cost also increases.

As for the control, according to the technique disclosed in the Japanese Patent Publication No. 9-160889, a processing is allocated to a control processor or a group of processors on a job basis. In this case, plural divisional controls (jobs) reside in one processor or a group of processors. Therefore, if the system management function of the disk array apparatus goes down due to a security crack or the like, for example, it may cause another function to go down.

SUMMARY OF THE INVENTION

The present invention has been devised to solve the problems described above, and an object of the present invention is to provide a disk array apparatus that is improved in cost-performance, prevents interaction among controls, and allows efficient use of resources.

In order to attain the object, according to an implementation of the present invention, there is provided a disk array apparatus that comprises a disk array controller having a CPU incorporating a plurality of processor cores (MPU cores) and performs a processing by allocating statically or dynamically each core to a self-contained program module. Here, the self-contained program module is a program that has a logical interface for boot up, stopping, failure recovery and external notification and can operate with another program in cooperative asynchronous manner.

The disk array apparatus according to the implementation of the present invention comprises means of managing the MPU cores as static or dynamic resources, monitor control means of monitoring the load status of each core and changes the number of cores allocated to each control processing without an external instruction as required, and failure handling means of terminating the processing of a failed core taking into consideration the dependent relationship among operating programs and performing fail-over to pass the processing to another disk array controller as required.

That is, the present invention provides a disk array apparatus comprising a disk array controller, in which the disk array controller has a CPU incorporating a plurality of processor cores that cannot be physically separated from each other, each processor core serves as an unit processor, one unit processor manages the unit processor itself and the other unit processors separately, allocates a self-contained control program to the unit processor itself or another unit processor dynamically so that the operation of the unit processor can be terminated appropriately or not-dynamically so that the unit processor can operate until the operation of the whole CPU is terminated, and manages the processing load or processing status of the control program on a unit-processor basis.

BRIEF DESCRIPTION OF THE DRAWINGS

FIG. 7 shows an example of an initial MPU core allocation management table in the control program;

FIG. 8 shows an example of an initial threshold management table in the control program;

FIG. 9 shows an example of an MPU core allocation table;

FIG. 10 shows a management screen 32 of a management terminal device 31 that displays MPU cores utilization;

DETAILED DESCRIPTION OF THE PREFERRED EMBODIMENTS

Best modes for carrying out the present invention will be described in detail.

In the following, a disk array apparatus and a method of controlling the disk array apparatus according to an embodiment of the present invention will be described with reference to the drawings.

Figure 1:
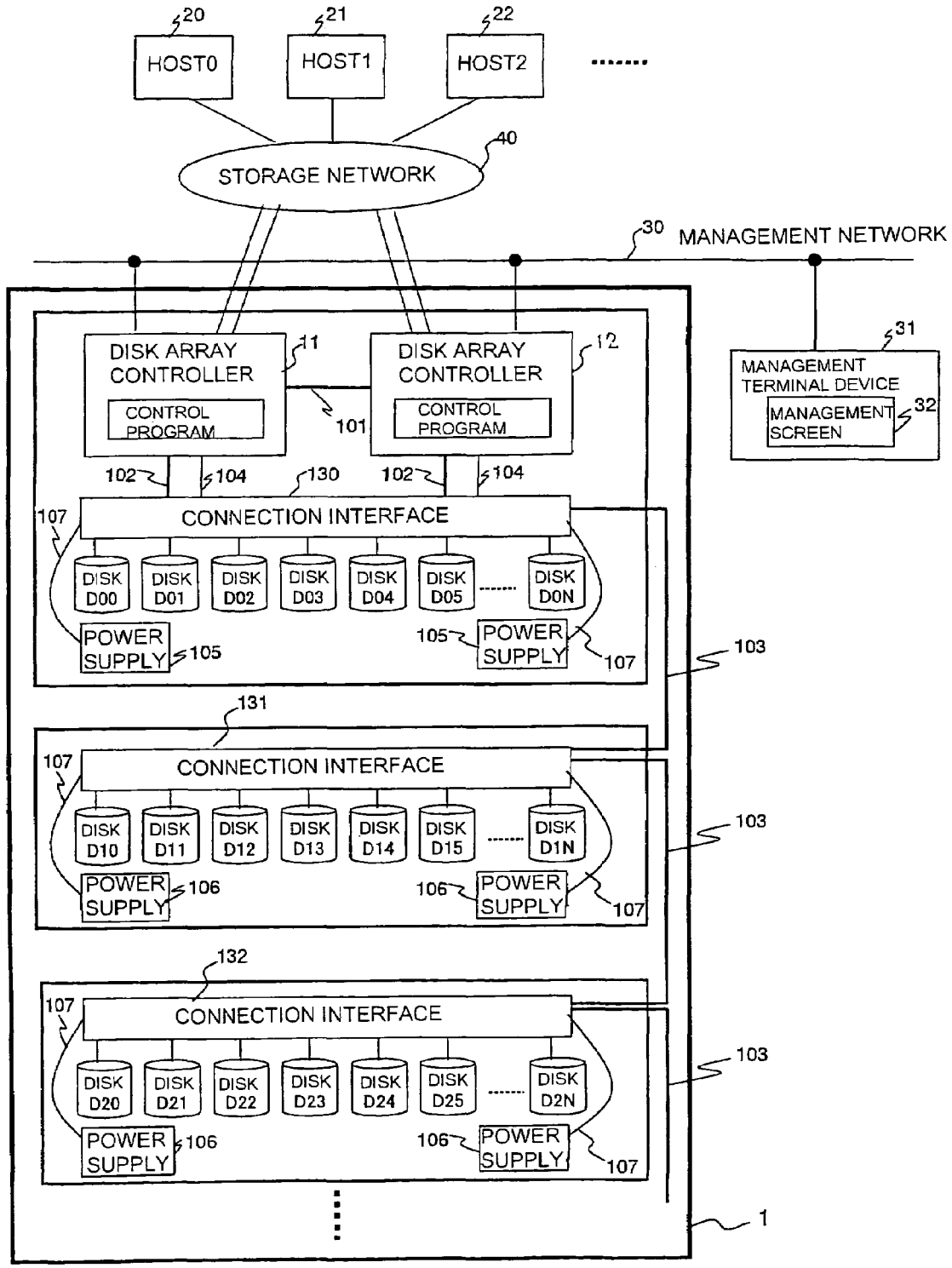
FIG. 1 is a schematic diagram showing an arrangement of a disk array apparatus according to an embodiment of the present invention.
Figure 2:
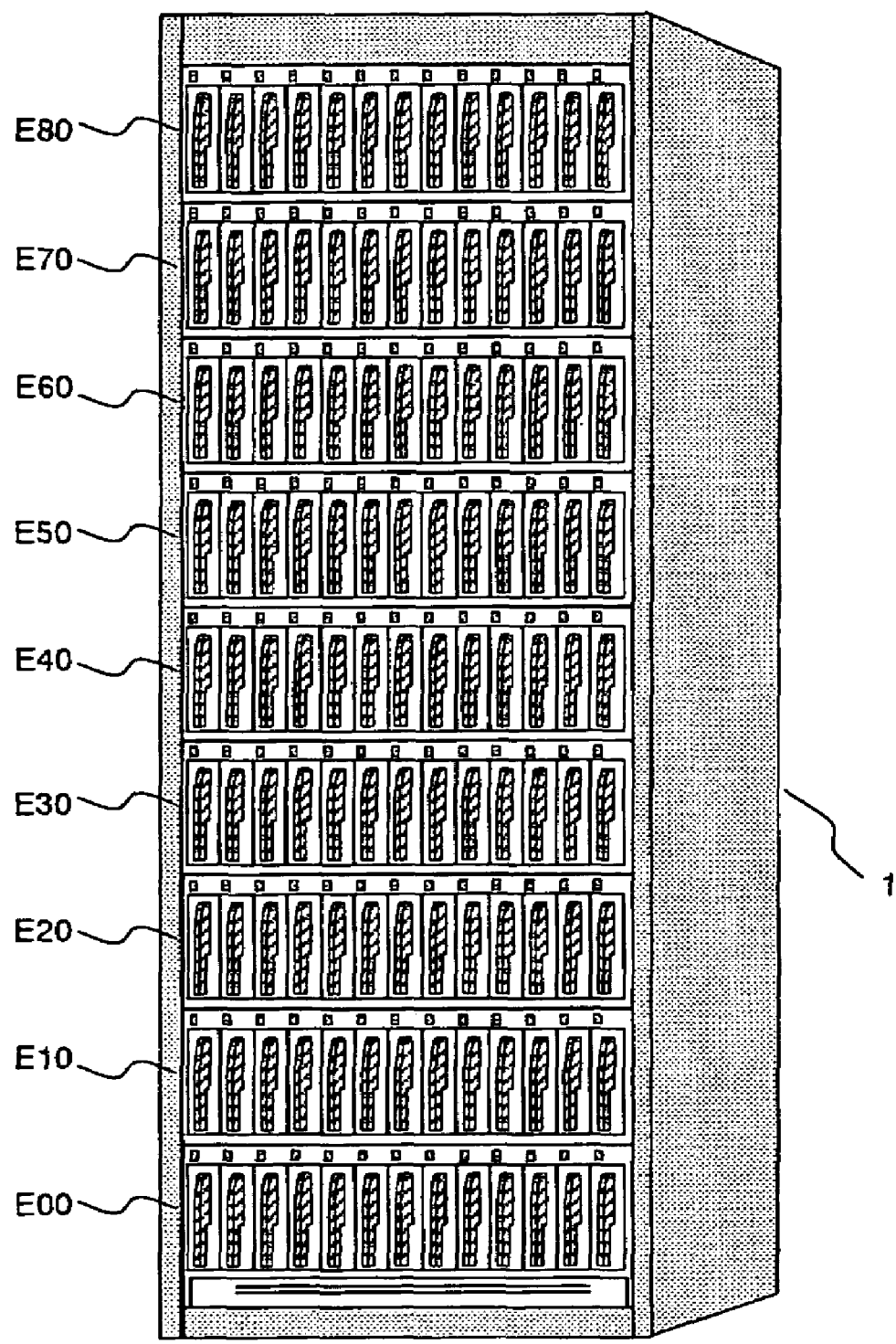
FIG. 2 is a schematic view of the disk array apparatus according to this embodiment.
Figure 3:
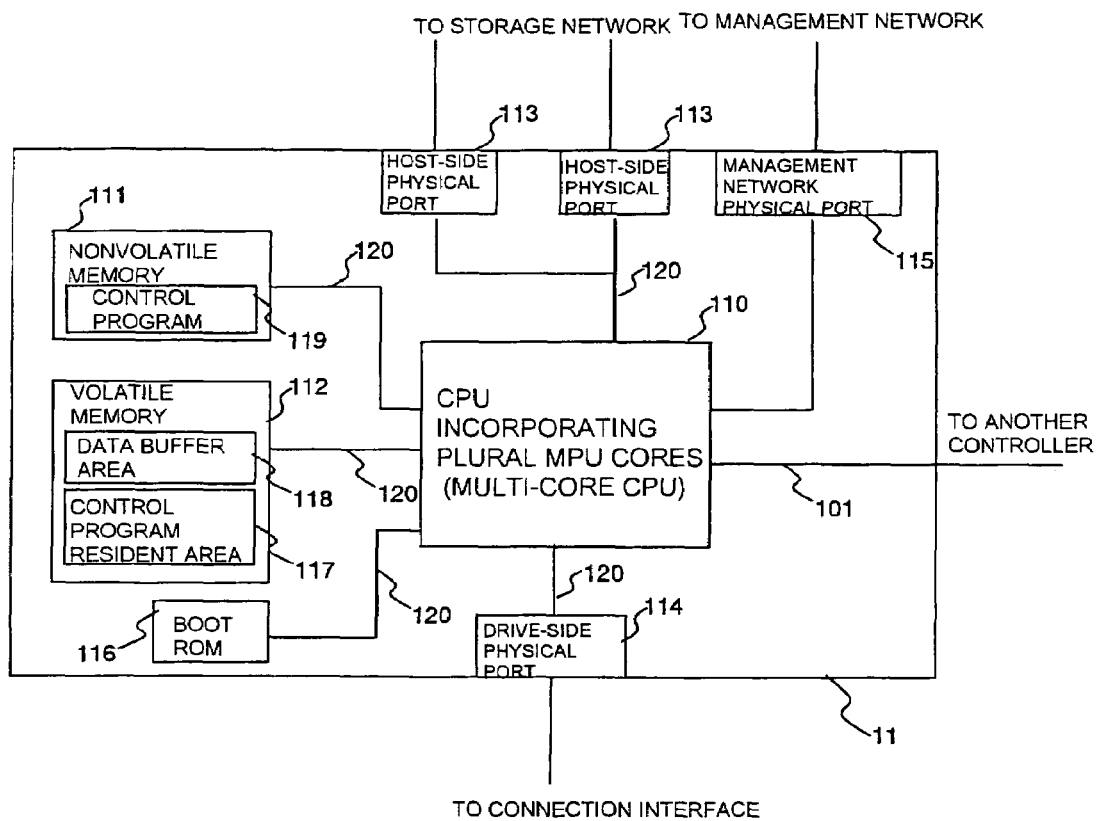
FIG. 3 is a block diagram showing a functional arrangement of a disk array controller of the disk array apparatus according to this embodiment.
Figure 4:
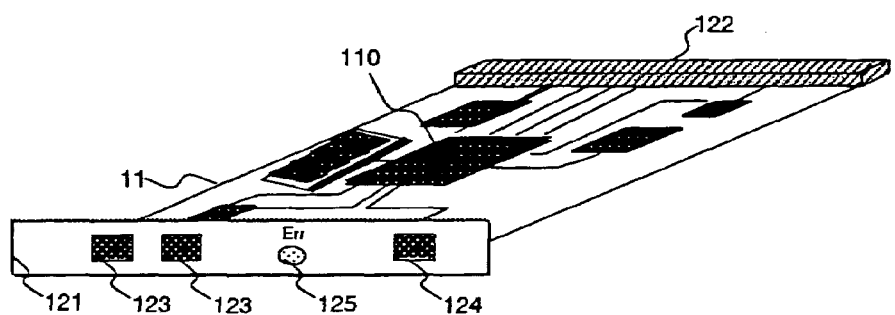
FIG. 4 is a schematic view of the disk array controller of the disk array apparatus according to this embodiment.
Figure 5:
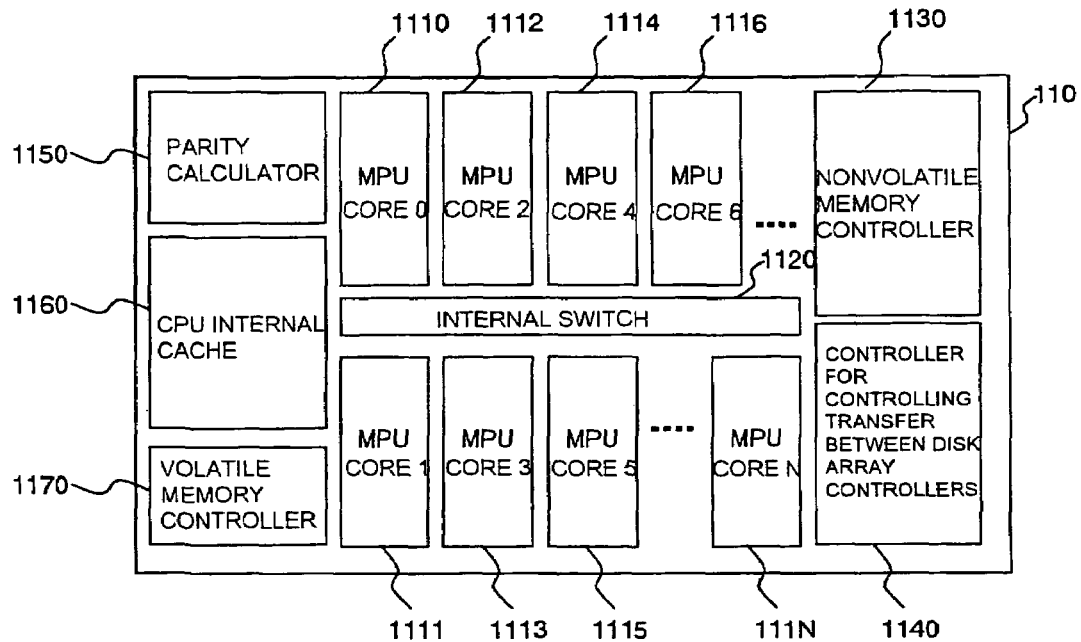
FIG. 5 is a block diagram showing a functional arrangement of a CPU (multi-core CPU) incorporating a plurality of processor cores (MPU cores) mounted on the disk array controller.

Now, an embodiment 1 will be described. An arrangement of a disk array apparatus according to this embodiment will be described with reference to FIGS. 1 to 8. FIG. 1 is a schematic diagram showing an arrangement of the disk array apparatus according to this embodiment. FIG. 2 is a schematic view of the disk array apparatus according to this embodiment. FIG. 3 is a block diagram showing a functional arrangement of a disk array controller of the disk array apparatus according to this embodiment, and FIG. 4 is a schematic view of the disk array controller. FIG. 5 is a block diagram showing a functional arrangement of a CPU incorporating a plurality of processor cores (MPU cores) mounted on the disk array controller of the disk array apparatus according to this embodiment (the CPU will be referred to as a multi-core CPU, hereinafter).

Figure 6:
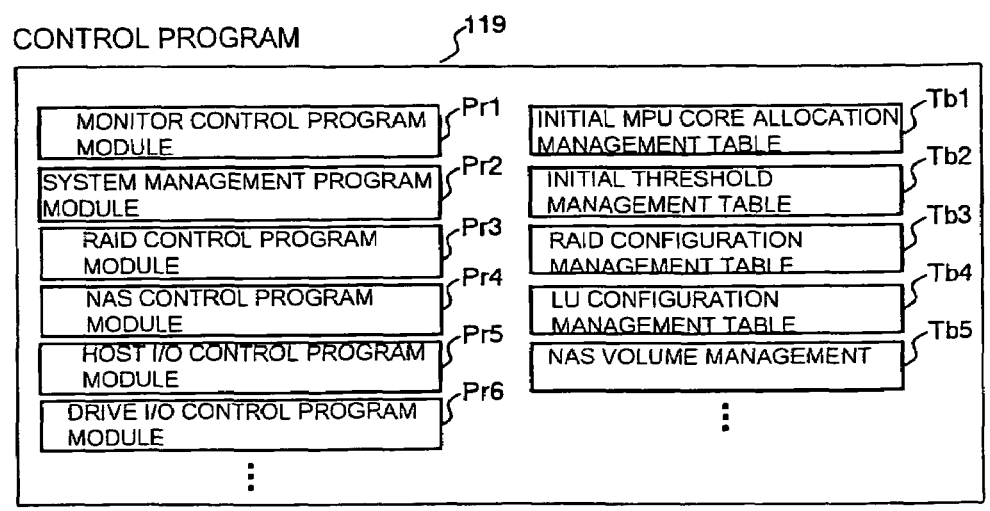
FIG. 6 is a diagram showing program modules and management tables contained in a control program.

FIG. 6 is a diagram showing program modules and management tables contained in a control program, and FIGS. 7 and 8 each show a specific management table. Now, the present invention will be described referring to these drawings one by one.

A disk array apparatus 1 according to this embodiment comprises disk array controllers 11 and 12, connection interfaces 130, 131 and 132, power supplies 105 and 106, and a plurality of disk units D00 to D2N. The disk units D00 to D2N are provided in the disk apparatus 1 as shown in FIG. 2, for example, and constitute a RAID system.

The disk array controllers 11 and 12 are control circuits that execute a control program to perform various control processings in the disk array apparatus 1. While the disk array apparatus has two disk array controllers 11 and 12 according to this embodiment, it may have one disk array controller or three or more disk array controllers. The disk array controllers 11 and 12 are interconnected via a signal line 101 and can communicate with each other. The disk array controllers 11 and 12 are connected to hosts 20, 21 and 22 via a storage network 40 and to a management terminal device 31 via a management network 30. For example, the storage network is an FC storage area network (FC-SAN) using a Fibre Channel or an IP-SAN using a TCP-/IP network, and the management network is an LAN using a TCP-/IP network or a point-to-point network using a serial cable.

The disk array controllers 11 and 12 are connected to the plurality of disk units D00 to D2N via the connection interfaces 130, 131 and 132. More specifically, the connection interface 130 is connected to the disk array controllers 11 and 12 via a signal line 102 and communicates therewith at regular intervals. The connection interfaces 130, 131 and 132 are connected to each other via a signal line 103. Therefore, the connection interface 131 is connected to the disk array controllers 11 and 12 via the connection interface 130, and the connection interface 132 is connected to the disk array controllers 11 and 12 via the connection interfaces 130 and 131.

The connection interface 130 is connected to the disk units D00 to D0N, the connection interface 131 is connected to the disk units D10 to D1N, and the connection interfaces 132 is connected to the disk units D20 to D2N.

A group of the disk controllers 11 and 12, the connection interface 130 and the disk units D00 to D0N is referred to as a basic enclosure, for example. A group of the connection interface 131 and the disk units D10 to D1N and a group of the connection interface 132 and the disk units D20 to D2N are expansion enclosure, for example. As can be seen from FIG. 1, the number of the expansion enclosures may be zero, one, or three or more.

According to this embodiment, the basic enclosure is a group of the disk controllers 11 and 12, the connection interface 130 and the disk units D00 to D0N. However, the basic enclosure may not include the disk units D01 to D0N.

The hosts 20, 21 and 22 are terminal devices for input of various types of data, for example. Data processed in the hosts 20, 21 and 22 are sequentially transmitted to and stored in the disk array apparatus 1. Here, only one host or four or more hosts are also possible.

The power supply 105 supplies operating power to the disk units D00 to D0N via a power line 107 and the connection interface 130 and supplies operating power to the disk array controllers 11 and 12 via the power line 107, the connection interface 130 and a power line 104. Similarly, the power supply 106 supplies operating power to the disk units D10 to D1N or D20 to D2N via the power line 107 and the connection interface 131 or 132.

Each disk unit D00 to D2N is a hard disk drive. For example, a hard disk drive based on the AT attachment standard (ATA standard) or a hard disk drive based on the serial attached SCSI standard (SAS standard) is used.

The management terminal 31 performs maintenance management of the disk array apparatus 1. The management terminal device 31 has a management screen 32, and the manager manages the status of the disk array apparatus 1 via the management screen 32.

With reference to FIG. 3, an internal arrangement of the disk array controller 11 will be described. Here, the disk array controller 12 has the same internal arrangement. The disk array controller 11 comprises a multi-core CPU 110, a nonvolatile memory 111, a volatile memory 112, host-side physical ports 113, drive-side physical ports 114, a management-network physical port 115, and a boot ROM 116.

The nonvolatile memory 111 stores a control program 119 for controlling the disk array apparatus 1. The nonvolatile memory 111 can retain data even if the power supply is stopped, and is a flash memory, for example. The control program 119 will be described in detail later with reference to FIG. 6.

The volatile memory 112 has a data buffer area 112 for temporarily storing data read from the disk units D, data to be written to the disk units D and the result of calculation of the multi-core CPU 110 and a control program resident area 117 for storing the control program 119 read for execution by the multi-core CPU 110. The volatile memory is a memory that cannot retain data if the power supply is stopped due to a power failure or the like, and is a dynamic random access memory (DRAM), for example.

The host-side physical port 113 is a port to a transmission line that is physically connected to the storage network 40 for transmitting/receiving electric signals to/from the hosts 20 to 22.

The drive-side physical port 114 is a port to a transmission line for transmitting/receiving electric signals to/from the connection interface.

The management-network physical port 115 is a port connected to the management network for transmitting/receiving electric signals to/from the management terminal device 31.

The boot ROM 116 is a read only memory storing an initial program loader that is used for reading the control program 119 from the nonvolatile memory 111 into the control program resident area 117 of the volatile memory 112 when the disk array apparatus 1 is booted up.

The multi-core CPU 110 is an arithmetic processor incorporating a plurality of processor cores (MPU cores) and is connected to the nonvolatile memory 111, the volatile memory 112, the host-side physical port 113, the drive-side physical port 114, the management-network physical port 115, the boot ROM 116 via signal lines 120. The multi-core CPU 110 reads/writes data from/to the nonvolatile memory 111 and the volatile memory 112 via the signal line 120, transmits/receives a command and data to/from the hosts 20 to 22 via the signal line 120 and the host-side physical port 113, and transmits/receives a command and data to/from the disk units D via the signal line 120 and the drive-side physical port 114, and the signal lines 102, 103 and the connection interfaces 130 to 132 shown in FIG. 1.

In addition, the multi-core CPU 110 is connected to another controller via the signal line 101 and transmits/receives data and a command to/from that another controller. To be specific, since FIG. 3 shows the disk array controller 11, that another controller is the disk array controller 12. In other words, for the disk array controller 12, another controller is the disk array controller 11.

FIG. 4 is a schematic view of the disk array controller 11. Here, the disk array controller 12 has the same appearance.

In addition to the multi-core CPU 110 and other components mounted on a circuit board and connected to each other as shown in FIG. 3, the disk array controller 11 has a connector 122, a bracket 121, a host connecting port 123, a management network connecting port 124 and an error indicating LED 125.

Furthermore, although not shown in FIG. 4, a heat sink or a fan for preventing a failure due to heat may be mounted above the semiconductor of the multi-core CPU 110 or the peripheral circuit.

Coupled with a connector on the connection interface 130, the connector 122 is physically connected to the signal lines 101 and 102 and the power line 104. The connector has a number of signal lines required in the disk array apparatus, such as a disk array controller insertion/removal detection line.

The host connecting port 123 is a connection port into which a connector of a cable to be connected to the storage network 40 is inserted. The management network connecting port 124 is a connection port into which a connector of a cable to be connected to the management network 30.

The error indicating LED 125 is an indicator lamp for providing a visual notification of an error to the outside of the disk array apparatus 1 when a failure occurs in the disk array controller 11 and some maintenance or replacement is required.

With reference to FIG. 5, an example of a functional arrangement of the multi-core CPU 110 in the disk array controller 11 will be described. The multi-core CPU 110 comprises a plurality of MPU cores (processor cores) 1110 to 111N, an internal switch 1120, a nonvolatile memory controller 1130, a controller 1140 for controlling transfer between disk array controllers, a parity calculator 1150, a CPU internal cache 1160 and a volatile memory controller 1170. The MPU cores 1110 to 111N are separate processors. However, unlike the conventional multiprocessor, the MPU cores are formed on one semiconductor device and, thus, cannot be used in a physically separated manner.

The internal switch 1120 provides a high-speed interconnection of the MPU cores 1110 to 111N, the nonvolatile memory controller 1130, the controller 1140 for controlling transfer between disk array controllers, the parity calculator 1150, the CPU internal cache 1160 and the volatile memory controller by a switching mechanism.

The nonvolatile memory controller 1130 is an I/O controller that performs data transfer between the nonvolatile memory 111 and the multi-core CPU 110 in accordance with an instruction from the MPU cores 1110 to 111N.

The controller 1140 for controlling transfer between disk array controllers transmits/receives a command and data to/from the multi-core CPU 110 in another disk array controller.

The parity calculator 1150 is used for quickly checking the parity generation or integrity of the data given in accordance with an instruction from the MPU cores 1110 to 111N. For example, a XOR calculator may be included.

The CPU internal cache 1160 is a volatile memory that can be accessed from the MPU cores 1110 to 111N in a shorter time than the volatile memory 112 that is outside of the multi-core CPU 110. The CPU internal cache 1160 is used for temporarily storing the result of calculation by the MPU cores 1110 to 111N and for storing an MPU core management table including the operation status of the MPU cores or the like.

The volatile memory controller 1170 is an I/O controller that performs data transfer between the volatile memory 112 and the multi-core CPU 110 in accordance with an instruction from the MPU cores 1110 to 111N.

As described above, the multi-core CPU 110 according to the present invention incorporates peripheral controlling circuits, such as the I/O controllers, in addition to the MPU cores. However, the multi-core CPU 110 may have another arrangement as far as it incorporates a plurality MPU cores. For example, the volatile memory controller may be provided as an external circuit rather than incorporated in the multi-core CPU, or the multi-core CPU may incorporate a TCP/IP controller.

With reference to FIG. 6, the control program 119 will be described in detail. The control program 119 comprises a monitor and control program module Pr1, a system management program module Pr2, an RAID control program module Pr3, an NAS control program module Pr4, a host I/O control program module Pr5, a drive I/O control program module Pr6, an initial MPU core allocation management table Tb1, an initial threshold management table Tb2, an RAID configuration management table Tb3, an LU configuration management table Tb4, and an NAS volume management table Tb5.

The monitor and control program module Pr1 is a program module with the highest privilege level that performs operation management of the program modules Pr2 to Pr6 and resource management of the MPU cores. The monitor and control program module Pr1 changes the number of allocated MPU cores according to the processing loads of the other program modules in an autonomous manner.

The system management program module Pr2 is a program module with the second highest privilege level. The system management program module Pr2 receives a configuration concerning operation/maintenance management of the disk array apparatus 1 from the management terminal device 31 and implements the configuration via another program module. For example, the operation/maintenance management includes configuration of a RAID group, configuration of a logical unit (LU), configuration of a network attached storage (NAS), configuration of host mapping, configuration of a monitoring function, update of the control program, check of the operation status, browse and acquisition of an operation log, configuration of disk surface check, and boot up or stop of the disk array apparatus.

Based on some operations via the management terminal device 31 received via the system management program module Pr2, the RAID control program module Pr3 performs creation of an RAID group, creation of an LU, initialization of an LU, and association between LUs and LU numbers (LUNs) and the hosts 20 to 22. In addition, the RAID control program module Pr3 interprets a command received from the hosts 20 to 22, performs calculation if necessary, issues a command to an appropriate disk unit D to read/write data to/from the disk unit D, notifies the hosts 20 to 22 of the result of command processing, and transmits/receives data to/from the hosts 20 to 22. The RAID control program module Pr3 performs similar command transmission/reception to/from the NAS control program module, and performs calculation and access to a disk unit D.

The NAS control program module Pr4 is a program module that processes a file level access from the hosts 20 to 22. In addition, the NAS control program module Pr4 performs construction of a file system on an LU created by the RAID control program module Pr3, modification of the size of the constructed file system, configuration of access to a file or directory, configuration of access authentication or the like.

The host I/O control program module Pr5 performs data transfer between the hosts 20 to 22 and the data buffer area 118 in the volatile memory 112 based on a transfer list created by the RAID control program module Pr3, while checking the data integrity by the parity calculator 1150. Similarly based on the transfer list created by the RAID control program module Pr4, the drive I/O control program module Pr6 performs data transfer between the disk units D and the data buffer area 118 in the volatile memory 112, while checking the data integrity by the parity calculator 1150.

The initial MPU core allocation management table Tb1 is a management table that contains specifications of the MPU core resource management and initial allocation of the control program modules Pr1 to Pr6 at the time of boot up of the disk array apparatus 1. The initial MPU core allocation management table Tb1 will be described in detail later with reference to FIG. 7.

The initial threshold management table Tb2 is a table for managing initial values of upper thresholds of loads of the program modules Pr1 to Pr6. The initial threshold management table Tb2 will be described in detail later with reference to FIG. 8.

The RAID configuration management table Tb3 is a table used for managing various kinds of information of RAID groups. For example, the RAID configuration management table Tb3 contains information about the RAID group number, the total storage capacity of the RAID group, the RAID level, the disk units comprising the RAID groups, and whether the status of the disk is normal or abnormal.

The LU configuration management table Tb4 is a table for managing a logical unit (LU) created on an RAID group. For example, the LU configuration management table Tb4 contains information about the LUN, the RAID group number to which the LU belongs, the storage capacity provided for the logical unit, and whether the status is normal or abnormal.

The NAS volume configuration management table Tb5 is a table for managing file systems created by the NAS. For example, the NAS volume configuration management table Tb5 contains information about the file system name, the number of the LU on which the file system is constructed, the format of the file system, the total capacity of the file system, the used capacity of the file system, whether differential management of the file system is performed, the differential management capacity, the utilization rate of the differential management capacity, the status of the file system and the like.

FIG. 7 shows an example of the initial MPU core allocation management table Tb1. The initial MPU core allocation management table Tb1 shown in FIG. 7 contains information about the MPU core number assigned to each MPU for the purpose of management, the name of the program module that initially uses the MPU, the type of module allocation, the privilege level, and the group number.

The module allocation is classified under three types, including a fixed type, a semi-fixed type and a dynamic type. The fixed type means that only the MPU core specified in the initial MPU core allocation management table can be allocated, and the semi-fixed type means that in addition to the MPU core specified in the initial MPU core allocation management table, another MPU core can be allocated for load balancing. The dynamic type means that the core is not initially allocated to a specific program module and is not used. For example, in FIG. 7, the MPU core 0 and the MPU core 1 are fixedly allocated to the monitor and control program module and the system management program module, respectively, and cannot be changed. On the other hand, while the MPU core 2 is initially allocated to the RAID control, another MPU core can be allocated to the RAID control as required.

The privilege level is an integral value that indicates a relationship between a controlling program module and a controlled program module. The smaller the integral value, the higher the privilege level. For example, in FIG. 7, the monitor and control program module has the highest privilege level 0. This means that the monitor and control program module is not controlled by any other program modules but can control all the other program modules. The system management module has a privilege level of 1. This means that the system management module is controlled only by the monitor and control program module whose privilege level is higher than the privilege level thereof. In other words, for example, the system management module can control the RAID control program module whose privilege level is 2, which is one lower than the privilege level thereof. Equal privilege levels mean that the program modules are independent of each other and don't control each other, for example.

The group number indicates the group of MPU cores that can be used for load balancing. For example, in FIG. 7, the MPU cores No. 6 and No. 7 belong to the group No. 003 and, therefore, can be used to distribute the load of the program module to which the MPU cores No. 2 and No. 3 which belong to the same group No. 003 are allocated.

FIG. 8 shows an example of the initial threshold management table Tb2. The initial threshold management table Tb2 shown in FIG. 8 contains information about the using module, the load threshold used for determining whether load balancing is required or not, and the number of times of exceeding the threshold used for determining when to start load balancing. For example, in FIG. 8, the load threshold of the monitor and control program module is 100. Since the load does not exceed 100%, the load of the monitor and control program module is not distributed even if the load is high. On the other hand, the load threshold of the RAID control program module is 90%. Thus, each time the load on the allocated MPU core exceeds 90%, the number of times of exceeding the threshold is incremented by 1. The load is regularly monitored, and when the number of times of exceeding the threshold exceeds five, which is a value specified in the field of prescribed number of times of exceeding the threshold, load balancing is started.

FIG. 9 shows an example of the MPU core allocation table managed by the monitor and control program module in the CPU internal cache. The MPU core allocation table shown in FIG. 9 contains information about the MPU core number, the load factor of the MPU core, the group number of the MPU core, the status, the name of the program module using the MPU core, the type of module allocation, the privilege level, and the number of times of exceeding the load threshold.

FIG. 10 shows the management terminal screen 32 of the management terminal 31 for checking the information about the utilization of MPU cores. In this screen, the number of an MPU core, and the name of the program module running on the MPU core, the status of the MPU core and the load on the MPU core are displayed, and these pieces of information are rewritten each time an update occurs.

Now, with reference to FIGS. 11 to 13, a method of controlling the disk array apparatus according to this embodiment will be described.

Figure 11:
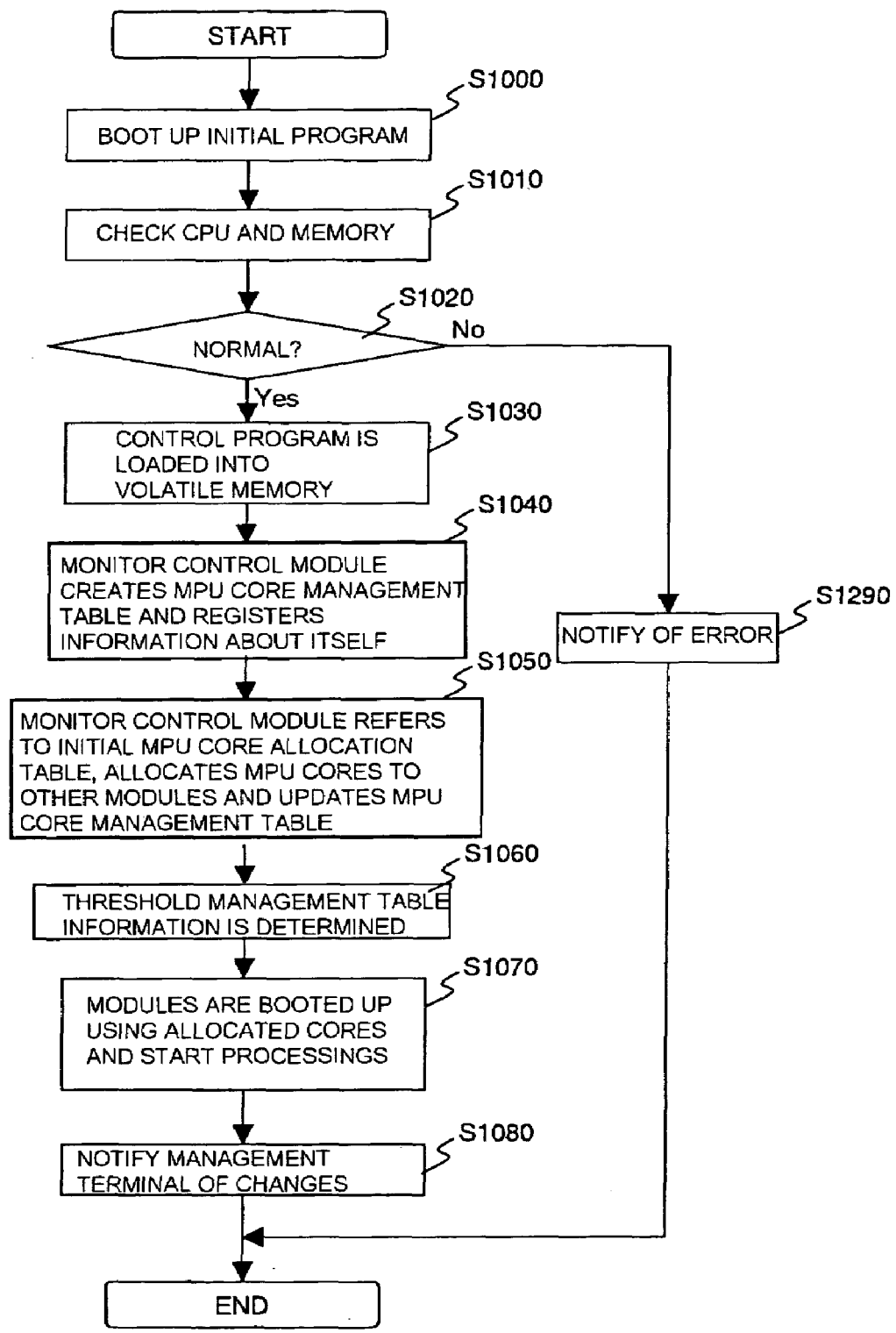
FIG. 11 is a flowchart showing a procedure of allocating MPU cores in the multi-core CPU to the control program.

With reference to FIG. 11, a procedure of allocating MPU cores in the multi-core CPU to the control program when the disk array apparatus 1 according to this embodiment is booted up will be described. FIG. 11 is a flowchart showing a procedure of loading the control program and allocating the MPU cores 1110 to 111N in the multi-core CPU 110 to the program modules.

The flowchart shown in FIG. 11 starts when the power switch of the disk array apparatus 1 is turned on, and the disk array controllers 11 and 12 are energized.

Once the disk array controllers 11 and 12 are energized, the multi-core CPU 110 makes the initial program loader in the boot ROM run (step S1000). The initial program loader checks the operation of the multi-core CPU 110 and the volatile memory 112 (step S1010). The operation check of the multi-core CPU can be accomplished by a CPU self-check function that allows the CPU to check whether the MPU cores 1110 to 111N operate normally or not, for example. The volatile memory check can be accomplished by writing a specific pattern of values to the memory and checking whether the values can be correctly read or not.

If the check results by the initial program loader indicate that the CPU and the volatile memory function normally (if Yes in step S1020), the process continues to the next step, where the control program 119 is loaded into the control program resident area 117 of the volatile memory 112, and the processing is passed from the initial program loader to the control program (step S1030).

Of the control program modules, the monitor and control program module Pr1 is first booted up. Then, the MPU core management table Tb6 is created in the CPU internal cache 1160, and the information about the monitor and control program module Pr1 is registered therein (step S1040). Then, the monitor and control program module Pr1 refers to the initial MPU core allocation management table Tb1, allocates MPU cores to the other modules, and updates the information in the MPU core management table Tb6 (step S1050). Then, based on the initial threshold management table Tb2, a load threshold and a prescribed number of times of exceeding the threshold are determined (step S1060). The program modules to which the MPU cores are allocated are booted up and start their respective control processings (step S1070).

This series of processings is reported to the manager via the management screen 32 and the management terminal 31 (step S1080).

On the other hand, if the check results by the initial program loader at the time of boot up indicate that the multi-core CPU or the volatile memory does not normally functions (if No in step S1020), it is determined that the disk array apparatus cannot operate, and an error notification is made. The error notification is made by the initial program loader providing to the management terminal 31 or by a speaker on the apparatus producing an alarm sound, for example.

Figure 12:
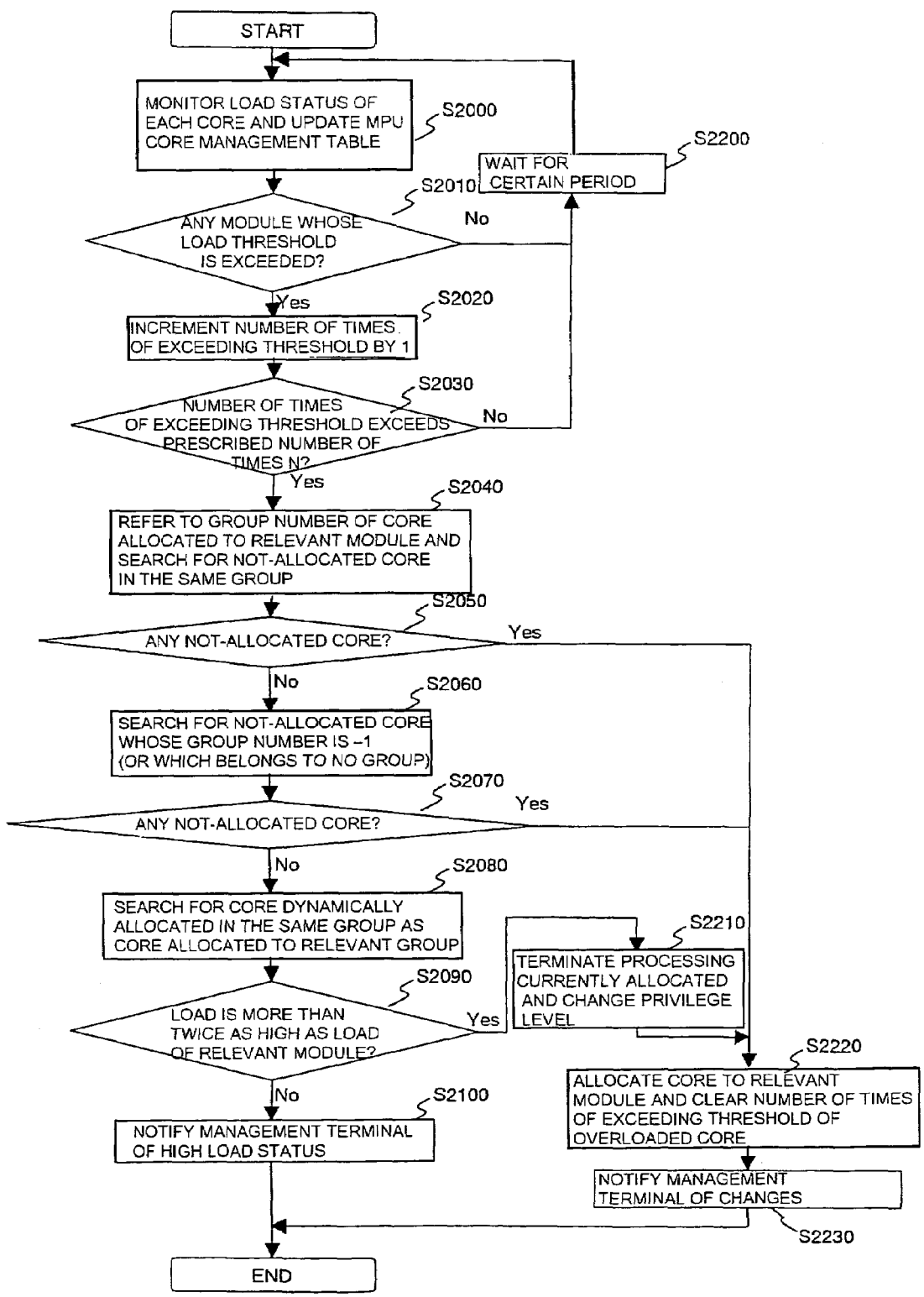
FIG. 12 is a flowchart showing an operation of a monitor and control program module for implementing a load balancing-control.

With reference to FIG. 12, an autonomous load balancing processing by the monitor and control program module Pr1 of the control program in the disk array apparatus 1 according to this embodiment will be described. FIG. 12 is a flowchart showing a procedure in which the monitor and control program module Pr1 detects an overload of a program module and allocates an additional MPU core to the program module for distributing the load.

The flowchart shown in FIG. 12 starts when the power switch of the disk array apparatus 1 is turned on, and the basic frame including the disk array controllers 11 and 12 and the expansion frame are energized, and the boot up of the control program according to the procedure shown in FIG. 11 is completed, and is repeatedly performed until the apparatus is stopped.

The monitor and control program module acquires inquiry information about the utilization of (or the load on) the MPU cores used by operating program modules and updates the information in the MPU core management table Tb6 (step S2000). Then, the monitor and control program module Pr1 refers to the load thresholds determined based on the initial threshold management table Tb2 to check for a module whose load threshold is exceeded. If there exists a module whose load threshold is exceeded (if Yes in step S2010), the number of times of exceeding the threshold for the relevant MPU core is incremented by 1, which is reflected to the MPU core management table Tb6. Then, it is checked whether the number of times of exceeding the threshold exceeds the prescribed number of times. If the number of times of exceeding the threshold exceeds the prescribed number of times N (if Yes in step S2030), the monitor and control program module Pr1 determines that the overload status of the program module has continued and the load has to be distributed. Then, the monitor and control program module Pr1 refers to the MPU core management table Tb6, acquires the group number of the MPU core allocated to the overload program module, and searches for an MPU core that has the same group number and has not been allocated (step S2040). If there exists an MPU core that has not been allocated (if Yes in step S2050), the MPU core is allocated to the overload module, and the information in the MPU management table Tb6 is updated by entering the name of the operating program module in the "using module" field of the MPU core allocated this time, and changing the privilege level thereof. Then, the number of times of exceeding the threshold of the MPU core determined to be overloaded is cleared to zero. Then, the management terminal is notified of these changes (step S2230), and the process ends.

On the other hand, if there exists no MPU core that has not been allocated and has the same group number as the MPU core currently allocated to the overload module (if No in step S2050), an MPU core is searched for which has not been allocated and has a group number of −1, which means that the MPU core does not belong to any group (step S2060).

If there exists an MPU core that does not belong to any group and has not been allocated (if Yes in step S2070), the MPU core is allocated to the overload module, and the information in the MPU management table Tb6 is updated by entering the name of the operating program module in the "using module" field of the MPU core allocated this time and changing the privilege level thereof. Then, the number of times of exceeding the threshold of the MPU core determined to be overloaded is cleared to zero. Then, the management terminal is notified of these changes (step S2230), and the process ends.

If there exists no MPU core that does not belong to any group and has not been allocated (if No in step S2070), no more MPU core cannot be allocated. Thus, of the MPU cores that is being used and can be dynamically allocated, an MPU core having the lowest utilization can be reallocated. Thus, an MPU core whose group number is the same as that of the MPU core currently allocated to the overload module and whose type of allocation is "dynamic" is searched for (step S2090). If the load on the MPU core found that can be dynamically allocated is more than twice as high as the load on the MPU core used by the overload module (if Yes in step S2090), that is, if the load of the overload program module is distributed between the two MPU cores and the load on each MPU core is higher than the load of the processing currently allocated to the MPU core, the processing currently allocated to the MPU core is terminated, the privilege level of the MPU core that can be dynamically allocated is changed to 255, thereby making the MPU core the not-allocated status (step S2210). Then, the resulting not-allocated MPU core is allocated to the overload module, the information in the MPU management table Tb6 is updated by entering the name of the operating program module in the "using module" field of the MPU core allocated this time and changing the privilege level thereof. Then, the number of times of exceeding the threshold of the MPU core determined to be overloaded is cleared to zero. Then, the management terminal is notified of these changes (step S2230), and the process ends.

If the load on the MPU core found that can be dynamically allocated is twice as high as or lower than twice as high as the load on the MPU core currently used by the overload module (if No in step S2090), the load of the program module cannot be distributed, the management terminal 31 is notified of the high load status, and the process ends.

In the monitoring of the load status of each MPU core mentioned at the beginning of the description of FIG. 12, if there exists no module whose load threshold is exceeded (if No in step S2010), or if the number of times of exceeding the threshold of any module whose load threshold is exceeded is less than the prescribed number of times (if No in step S2030), it is determined that MPU reallocation for load balancing is not required, a certain waiting period is provided (step S2200), and then the monitoring of the load status is repeated.

Figure 13:
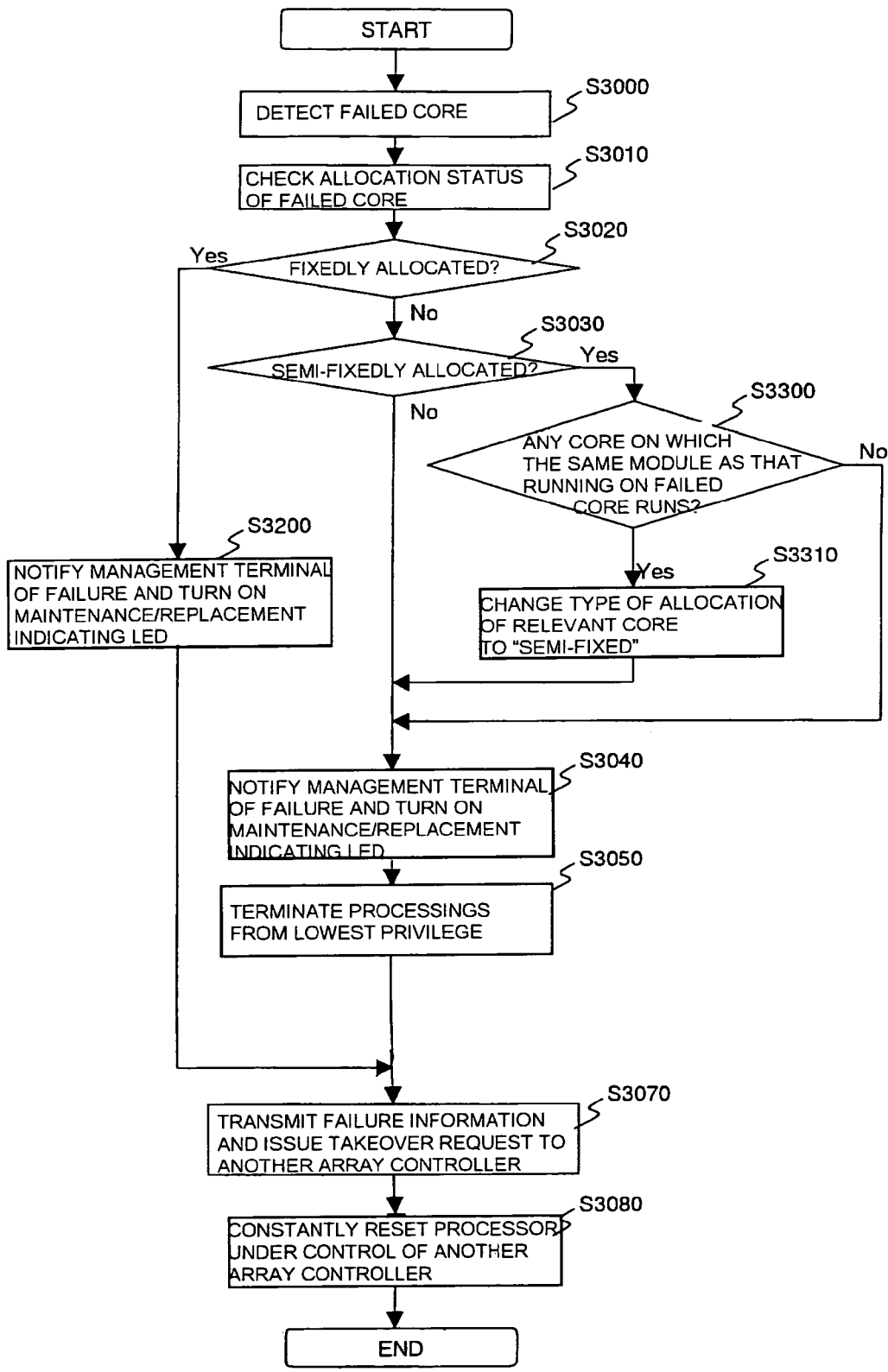
FIG. 13 is a flowchart showing a failure recovery procedure performed when a failure occurs in an MPU core in the multi-core CPU.

With reference to FIG. 13, there will be described a process for recovering from a failure occurring in an MPU in the multi-core CPU in the disk array controller of the disk array apparatus according to this embodiment. Since the MPU cores in the multi-core CPU cannot be physically separated, if a physical failure occurs in an MPU core, the whole CPU has to be replaced with a new one. FIG. 13 is a flowchart showing a procedure of terminating an operating program module for fail-over in order to recover from a failure.

The flowchart shown in FIG. 13 is performed when a failure occurs in a particular MPU core $111x$ (x: an integer) in the multi-core CPU 110.

If the monitor and control program module Pr1 detects a failure occurring in an MPU core $111x$ (step S3000), the monitor and control program module Pr1 refers to the MPU core allocation table Tb6 to check the allocation status of the MPU core $111x$ and changes the status thereof to "failure" (step S3010). Specifically, the monitor and control program module Pr1 checks whether the MPU core $111x$ has been already allocated or not, and if already allocated, checks the type of allocation thereof.

If the failed MPU core $111x$ is fixedly allocated (if Yes in step S3020), the MPU core $111x$ is a core that performs the monitor control of the other processings or the system management control via the management terminal 31, and therefore, there is a possibility that the fail-over process cannot be normally conducted. Thus, if the monitor and control program module Pr1 can operate, the monitor and control program module Pr1 attempts to turn on the error indicating LED 125 for notifying the management terminal 31 of the failure and the requirement for maintenance or replacement (step S3200), and transmits failure information to another disk array controller via the signal line 101, thereby issuing a processing takeover request thereto (step S3070). If such a serious failure that disables the processing in step S3200 or S3070 occurs, the other disk controller can recognize the failure because the regular communication between the disk array controllers via the signal line 101 is interrupted.

If the other disk array controller receives the processing takeover request in step S3070 or recognizes the interruption of the communication via the signal line 101 with the disk array controller on the other end of the line, the disk array controller determines that a failure occurs in the disk array controller one the other end of the line and constantly applies reset signals to the multi-core CPU 110 in the failed disk array controller via the signal line. Because of the reset signals constantly applied, the failed multi-core CPU 110 is continuously reset and, therefore, can no longer operate. Thus, the possibility of data corruption due to a malfunction of the MPU core $111x$ can be avoided. While the operation of the multi-core CPU is stopped by constantly resetting the CPU in this embodiment, it can be accomplished in other ways, such as by stopping the supply of power.

If the failed MPU core $111x$ is allocated semi-fixedly, the monitor and control program module Pr1 checks the MPU core allocation table Tb6 for an MPU core on which the same program module as that running on the failed MPU core $111x$ runs (step S3300).

If an MPU core on which the same program module as that running on the failed MPU core $111x$ runs is found, the monitor and control program module Pr1 changes the type of allocation of the MPU core on which the relevant program module runs from "dynamic" to "semi-fixed" (step S3310), and then notifies the management terminal of the failure to make it turn on the maintenance/replacement indicating LED (step S3040).

Then, referring to the MPU core allocation table Tb6, the monitor and control program module terminates the program modules successively from the highest privilege level to the lowest privilege level (step S3050).

Then, the process continues to steps S3070 and S3080. These steps have been already described, and further descriptions thereof will be omitted.

On the other hand, if there exits no MPU core allocated to the same program module as that allocated to the failed MPU core, the process continues to step S3040.

If the failed MPU core $111x$ is allocated neither in the fixed manner (No in step S3020) nor in the semi-fixed manner (No in step S3030), that is, if the failed MPU core $111x$ is allocated dynamically, the monitor and control program module Pr1 performs steps S3040 to S3080. Since steps S3040 to S3080 have been already described, further descriptions thereof will be omitted.

According to the embodiment described above, the disk array apparatus according to the present invention manages a plurality of MPU cores as fixed, semi-fixed or dynamic resources using the management table, so that a failure can be prevented from affecting the whole processing. In addition, by monitoring the load status of the MPU cores, the disk array apparatus can use the CPU resource efficiently on a core basis.

In addition, when a failure occurs, the disk array apparatus can accomplish fail-over taking into consideration the dependent relationship among operating program modules by checking the privilege levels thereof. Thus, the disk array apparatus can recover from a failure occurring in a particular core in the multi-core CPU.

In addition to the embodiment described above, according an implementation 1 of the present invention, the one unit processor reallocates one or more of control programs allocated not-dynamically to a unit processor to another unit processor dynamically.

According to an implementation 2 of the present invention, in the disk array apparatus, the one unit processor allocates one or more of control programs allocated not-dynamically to a unit processor only to the unit processor.

According to an implementation 3 of the present invention, in the disk array apparatus, when the processing load on a unit processor to which a control program is not-dynamically allocated is relatively high, the one unit processor terminates the processing of a unit processor to which a control program is dynamically allocated and whose processing load is relatively low, and reallocates the control program allocated to the unit processor whose processing load is relatively high to the terminated unit processor dynamically.

According to an implementation 4 of the present invention, in the disk array apparatus, the one unit processor terminates the processing of a unit processor which is included in a group to which the unit processor whose processing load of the control program is relatively high and has a relatively low processing load of the dynamically allocated control program, and reallocates the control program allocated to the unit processor whose processing load is relatively high to the terminated unit processor dynamically.

According to an implementation 5 of the present invention, in the disk array apparatus, the one unit processor reallocates the control program allocated to the unit processor whose processing load is relatively high to a unit processor that belongs no group, and makes the unit processor belong to the group to which the unit processor whose processing load is relatively high.

According to an implementation 6 of the present invention, there is provided a disk array apparatus comprising a disk array controller, in which the disk array controller has a CPU incorporating a plurality of processor cores that cannot be physically separated from each other, each processor core serves as an unit processor, one unit processor manages all the unit processors separately, allocates a self-contained control program to each unit processor dynamically so that the operation of the unit processor can be terminated appropriately or not-dynamically so that the unit processor can operate until the operation of the whole CPU is terminated, manages the processing load or processing status of the allocated control program on a unit-processor basis, and terminates all the control programs, if a failure occurs in a particular processor core, taking into consideration whether the control program is allocated to the processor core or unit processor dynamically or not-dynamically and the order of termination of the control programs.

According to an implementation 7 of the present invention, in the disk array apparatus, if the control program is allocated not-dynamically to the failed processor core or unit processor, and there is another unit processor to which the control program is dynamically allocated, the one unit processor allocates the control program to the another unit processor not-dynamically.

According to an implementation 8 of the present invention, in the disk array apparatus, if the control program is not-dynamically allocated only to the failed processor core or unit processor, the one unit processor terminates the operation of the whole CPU.

According to an implementation 9 of the present invention, in the disk array apparatus, the disk array controller having a CPU incorporating a plurality of processor cores that cannot be physically separated from each other further has an internal switch, a nonvolatile memory controller, a volatile memory controller, a controller for controlling transfer between disk array controllers, a parity calculator and a CPU internal cache, the control program comprises a monitor and control program module, a system management program module, an RAID control program module, an NAS control program module, a host I/O control program module, a drive I/O control program module, an initial MPU core allocation management table, an initial threshold management table, an RAID configuration management table, an LU configuration management table and an NAS volume management table, and the one unit processor monitors the load status of the control program on the unit processor itself and other unit processors, and, if the number of times of exceeding a load threshold of a unit processor exceeds a prescribed number of times, the one unit processor searches for a not-allocated core in the same group as the unit processor and allocates the control program to the found not-allocated core.

According to an implementation 10 of the present invention, there is provided a method of controlling a disk array apparatus comprising a disk array controller having a CPU incorporating a plurality of processor cores that cannot be physically separated from each other, each of the processor cores serving as a unit processor, in which all the unit processors are managed separately, a self-contained control program is allocated to each unit processor dynamically so that the operation of the unit processor can be terminated appropriately or not-dynamically so that the unit processor can operate until the operation of the whole CPU is terminated, and the processing load or processing status of the allocated control program is managed on a unit-processor basis.

What is claimed is:

1. A disk array apparatus for storing data in a plurality of disk drives comprising:

a disk array controller for controlling said disk array apparatus including controlling read and write of data from and to said disk drives, wherein the disk array controller has a central processing unit (CPU) incorporating a plurality of processor cores that cannot be used in a physically separated manner, and each processor core serves as a unit processor, wherein one unit processor manages itself and the other unit processors individually, allocates a different portion of a control program to itself and the other unit processors dynamically so that the operation of each unit processor can be terminated appropriately or not-dynamically to cause each unit processor to operate until the operation of the whole CPU is terminated, and manages the processing load or processing status of the control program on a unit-processor basis, wherein execution of the different portions of the control program is shared among said unit processors, wherein the portions of the control program are dynamically allocated to different unit processors, during execution of the control program, to manage the processing load or processing status of the control program according to predetermined load criteria, wherein the disk array controller having a CPU incorporating a plurality of processor cores that cannot be physically separated from each other further has an internal switch, a nonvolatile memory controller, a volatile memory controller, a controller for controlling transfer between disk array controllers, a parity calculator and a CPU internal cache, wherein the control program comprises a monitor control program module, a system management program module, Redundant Array of Inexpensive Disk Drive (RAID) control program module, an Network Attached Storage (NAS) control program module, a host Input/Output (I/O) control program module, a drive I/O control program module, an initial Multi-Processing Unit (MPU) core allocation management table, an initial threshold management table, a RAID configuration management table, an LU configuration management table, and an NAS volume management table, and wherein the one unit processor monitors the load status of the control program on itself and another unit processors, and if the number of times of exceeding a load threshold of a unit processor exceeds a prescribed number of times, the one unit processor searches for a not-allocated core in the same group as the unit processor and allocates the control program to the found not-allocated core.

2. The disk array apparatus according to claim 1, wherein the one unit processor reallocates one or more of the portions of the control program, allocated not-dynamically to a unit processor, to another unit processor dynamically.

3. The disk array apparatus according to claim 1, wherein the one unit processor allocates one or more of the portions of the control program, allocated not-dynamically to a unit processor only, to the unit processor.

4. The disk array apparatus according to claim 1, wherein, when the processing load on a unit processor to which a portion of the control program is not-dynamically allocated is high relative to the other unit processors, the one unit processor terminates the processing of a unit processor to which a portion of the control program is dynamically allocated and whose processing load is low relative to the other unit processors, and reallocates the portion of the control program allocated to the unit processor whose processing load is relatively high to the terminated unit processor dynamically.

5. The disk array apparatus according to claim 4, wherein the one unit processor terminates the processing of a unit processor, which is included in a group to which the unit processor whose processing load of the control program is high relative to the other unit processors, and which has a processing load of the control program that is low relative to the other unit processors, and reallocates the control program, allocated to the unit processor whose processing load is high relative to the other unit processors, to the unit processor in which the processing has been terminated, dynamically.

6. The disk array apparatus according to claim 4, wherein the one unit processor reallocates the control program allocated to the unit processor whose processing load is high relative to the other unit processors to a unit processor that belongs to no group, and makes the unit processor that belongs to no group belong to the group to which the unit processor whose processing load is high relative to the other unit processors.

7. A disk array apparatus for storing data in a plurality of disk drives comprising:
a disk array controller for controlling said disk array apparatus including controlling read and write of data from and to said disk drives,
wherein the disk array controller has a central processing unit (CPU) incorporating a plurality of processor cores that cannot be used in a physically separated manner, and each processor core serves as a unit processor,
wherein one unit processor manages all the unit processors separately, allocates at least a different one of a plurality of portions of a control program to each unit processor dynamically so that the operation of the unit processor can be terminated appropriately or not-dynamically to cause the unit processor to operate until the operation of the whole CPU is terminated, manages the processing load or processing status of the allocated portion of the control program on a unit-processor basis, and terminates all portions of the control program, if a failure occurs in a particular processor core, taking into consideration whether a portion of the control program is allocated to the processor core or unit processor dynamically or not-dynamically and the order of termination of the portions of the control program,
wherein execution of the different portions of the control program is shared among said unit processors,
wherein the portions of the control program are dynamically allocated to different unit processors, during execution of the control program, to manage the processing load or processing status of the control program according to predetermined load criteria,
wherein the disk array controller having a CPU incorporating a plurality of processor cores that cannot be physically separated from each other further has an internal switch, a nonvolatile memory controller, a volatile memory controller, a controller for controlling transfer between disk array controllers, a parity calculator and a CPU internal cache,
wherein the control program comprises a monitor control program module, a system management program module, Redundant Array of Inexpensive Disk Drive (RAID) control program module, an Network Attached Storage (NAS) control program module, a host Input/Output (I/O) control program module, a drive I/O control program module, an initial Multi-Processing Unit (MPU) core allocation management table, an initial threshold management table, a RAID configuration management table, an LU configuration management table, and an NAS volume management table, and
wherein the one unit processor monitors the load status of the control program on itself and another unit processors, and if the number of times of exceeding a load threshold of a unit processor exceeds a prescribed number of times, the one unit processor searches for a not-allocated core in the same group as the unit processor and allocates the control program to the found not-allocated core.

8. The disk array apparatus according to claim 7, wherein, if a portion of the control program is allocated not-dynamically to a failed processor core or unit processor, and there is another unit processor to which a portion of the control program is dynamically allocated, the one unit processor allocates the portion of the control program to the another unit processor not-dynamically.

9. The disk array apparatus according to claim 7, wherein, if the portion of the control program is not-dynamically allocated only to the failed processor core or unit processor, the one unit processor terminates the operation of the whole CPU.

10. A disk array apparatus for storing data in a plurality of disk drives comprising:
a disk array controller for controlling said disk array apparatus including controlling read and write of data from and to said disk drives,
wherein the disk array controller has a central processing unit (CPU) incorporating a plurality of processor cores that cannot be used in a physically separated manner, and each processor core serves as a unit processor,
wherein one unit processor manages itself and the other unit processors individually, allocates a self-contained control program to itself or the other unit processors dynamically so that the operation of each unit processor can be terminated appropriately or not-dynamically so that each unit processor can operate until the operation of the whole CPU is terminated, and manages the processing load or processing status of the control program on a unit-processor basis, wherein the disk array controller having a CPU incorporating a plurality of processor cores that cannot be physically separated from each other further has an internal switch, a nonvolatile memory controller, a volatile memory controller, a controller for controlling transfer between disk array controllers, a parity calculator and a CPU internal cache, wherein the control program comprises a monitor control program module, a system management program module, Redundant Array of Inexpensive Disk Drive (RAID) control program module, an Network Attached Storage (NAS) control program module, a host Input/Output (I/O) control program module, a drive I/O control program module, an initial Multi-Processing Unit (MPU) core allocation management table, an initial threshold management table, a RAID configuration management table, an LU configuration management table, and an NAS volume management table, and wherein the one unit processor monitors the load status of the control program on itself and another unit processors, and if the number of times of exceeding a load threshold of a unit processor exceeds a prescribed number of times, the one unit processor searches for a not-allocated core in the same group as the unit processor and allocates the control program to the found not-allocated core.

* * * * *